(12) United States Patent
Higuchi

(10) Patent No.: US 6,715,505 B2
(45) Date of Patent: Apr. 6, 2004

(54) STEAM PRESSURE REDUCING AND CONDITIONING VALVE

(75) Inventor: Hiroyuki Higuchi, Kashiwazaki (JP)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 10/038,985

(22) Filed: Jan. 4, 2002

(65) Prior Publication Data

US 2002/0092572 A1 Jul. 18, 2002

(51) Int. Cl.[7] .............................................. F16K 11/00
(52) U.S. Cl. ........................................... 137/9; 137/605
(58) Field of Search ................................ 137/605, 606, 137/607, 9

(56) References Cited

U.S. PATENT DOCUMENTS

| | | | |
|---|---|---|---|
| 1,152,176 A | 8/1915 | Hennebohle | |
| 1,307,986 A | 6/1919 | Randall and Schmid | |
| 1,832,652 A | 11/1931 | Peebles | |
| 2,095,263 A | 10/1937 | Moss | 251/11 |
| 2,207,646 A | 7/1940 | Van Der Ploeg | 122/459 |
| 2,354,842 A | 8/1944 | Spence | 261/116 |
| 2,421,761 A | 6/1947 | Rowand et al. | |

(List continued on next page.)

FOREIGN PATENT DOCUMENTS

| | | |
|---|---|---|
| DE | 37 17 128 A1 | 12/1988 |
| DE | 298 01 762 U1 | 4/1998 |
| FR | 595499 | 10/1925 |
| FR | 2082083 | 11/1971 |
| GB | 772058 | 4/1957 |
| GB | 2 019 532 | 10/1979 |
| JP | 61153082 | 7/1986 |
| WO | WO 91/00971 | 1/1991 |
| WO | WO 97 03313 | 1/1997 |

OTHER PUBLICATIONS

European Patent Office Search Report signed by Girbes Fontana, completed Sep. 8, 2003.
European Search report for Application 02007252 dated Apr. 3, 2003.
Hiroyuki Higuchi, Steam Pressure Reducing and Conditioning System, U.S. patent application Ser. No. 10/039,343, filed Jan. 4, 2002.
Patent application Ser. No. 10/082,620, filed Feb. 22,2002.
Stares, Gober and Robert; "4100 Series Control Valves"; Masoneilan; May 1997; 6 pages.
SteamForm Conditioning Valves, Yarway Tyco Corporation 1981.
Copes–Vulcon; SA–35 Steam Atomizing Desuperheater, White; Consolidated Industries, Bulletin 1164; May 1; 5 pages.
Patent Application Ser. No. 10/039,345, filed Jan. 4, 2002.
Patent Application Ser. No. 10/038,985, filed Jan. 4, 2002.
Product Brochure titled "Masonelian Steam Form II" printed Oct. 12, 2001 and distributed at Power Generation Show held in Las Vegas, Nevada on Dec. 11–13, 2001 and at Power Generation Show in Milan, Italy Jun. 11–13, 2002.

*Primary Examiner*—Stephen M. Hepperle
(74) *Attorney, Agent, or Firm*—Fish & Richardson P.C.

(57) ABSTRACT

A steam pressure reducing and conditioning valve comprising a first port 21 for inflowing superheated steam S, a body 23 having a cylindrical diffuser with bottom 22 where small holes 22a are scattered on the side, and a second port 24 for discharging depressurized steam S1 by the diffuser and supplying moisture W from one or more nozzles 35 to the depressurized steam S1, wherein a protrusion 26 projects inward in a vapor discharge path 29 of the body 23 between the diffuser 22 and the moisture supply section 25, and it is so structured that the depressurized steam S1 exiting from the small hole 22a is concentrated into the body 23 by this protrusion 26, made to pass inside the protrusion 26, increasing the velocity of steam S1, and then desuperheated by supplying the steam S1 with subcooled water W.

12 Claims, 3 Drawing Sheets

U.S. PATENT DOCUMENTS

| | | | |
|---|---|---|---|
| 2,924,424 A | 2/1960 | Titterington | 251/305 |
| 2,984,468 A | 5/1961 | Kuhner | 261/79 |
| 3,050,262 A | 8/1962 | Curtis | 239/400 |
| 3,034,771 A | 11/1962 | Marris | 261/36 |
| 3,207,492 A | 9/1965 | Zikesch | |
| 3,219,323 A | 11/1965 | Spence | |
| 3,220,708 A | 11/1965 | Matsui | 261/39 |
| 3,318,321 A | 5/1967 | Odendahl | 137/117 |
| 3,331,590 A | 7/1967 | Battenfeld et al. | 261/50 |
| 3,496,724 A | 2/1970 | Wilson | 60/105 |
| 3,648,714 A | 3/1972 | Laveau | 137/7 |
| 3,709,245 A | 1/1973 | O'Connor, Jr. | 251/127 |
| 3,719,524 A | 3/1973 | Ripley et al. | |
| 3,722,854 A | 3/1973 | Parola | 251/127 |
| 3,732,851 A | 5/1973 | Self | |
| 3,735,778 A | 5/1973 | Garnier | 137/604 |
| 3,746,049 A | 7/1973 | O'Connor, Jr. | 137/802 |
| 3,750,698 A | 8/1973 | Walchle et al. | 137/375 |
| 3,776,278 A | 12/1973 | Allen | 137/625.38 |
| 3,813,079 A | 5/1974 | Baumann et al. | 251/127 |
| 3,856,149 A | 12/1974 | Scull | 138/42 |
| 3,904,722 A | 9/1975 | Onodo et al. | |
| 3,931,371 A | 1/1976 | Maurer et al. | |
| 3,941,350 A | 3/1976 | Kluczynski | 251/127 |
| 3,978,891 A | 9/1976 | Vick | 138/42 |
| 3,981,946 A | 9/1976 | Soya et al. | |
| 3,990,475 A | 11/1976 | Myers | 137/625.3 |
| 4,011,287 A | 3/1977 | Marley | |
| 4,022,423 A | 5/1977 | O'Connor et al. | 251/127 |
| 4,068,683 A | 1/1978 | Self | 137/625.3 |
| RE29,714 E | 8/1978 | Hayner et al. | 138/42 |
| 4,105,048 A | 8/1978 | Self | 138/42 |
| 4,128,109 A | 12/1978 | Chervenak et al. | 137/375 |
| 4,149,563 A | 4/1979 | Seger | 137/625.3 |
| 4,243,203 A | 1/1981 | Mack | 251/305 |
| 4,249,574 A | 2/1981 | Schnall et al. | 137/625.3 |
| 4,267,045 A | 5/1981 | Hoof | 210/322 |
| 4,270,559 A | 6/1981 | Wallberg | 137/15 |
| 4,278,619 A | 7/1981 | Tiefenthaler | |
| 4,279,274 A | 7/1981 | Seger | 138/42 |
| 4,352,373 A | 10/1982 | Kay et al. | 137/561 |
| 4,383,553 A | 5/1983 | Platt | 138/46 |
| 4,387,732 A | 6/1983 | Hetz | 137/183 |
| 4,397,331 A | 8/1983 | Medlar | 137/375 |
| 4,407,327 A | 10/1983 | Hanson et al. | 137/625 |
| 4,413,646 A | 11/1983 | Platt et al. | 137/240 |
| 4,427,030 A | 1/1984 | Jouwsma | 138/42 |
| 4,442,047 A | 4/1984 | Johnson | |
| 4,505,865 A | 3/1985 | Wullenkord | 261/44 |
| 4,567,915 A | 2/1986 | Bates et al. | 138/42 |
| 4,593,446 A | 6/1986 | Hayner | 29/157 |
| RE32,197 E | 7/1986 | Self | 251/127 |
| 4,619,436 A | 10/1986 | Bonzer et al. | 251/61.1 |
| 4,624,442 A | 11/1986 | Duffy et al. | 251/61.1 |
| 4,671,321 A | 6/1987 | Paetzel et al. | 137/625.3 |
| 4,688,472 A | 8/1987 | Inglis | 98/1 |
| 4,718,456 A | 1/1988 | Schoonover | 137/625.37 |
| 4,739,795 A | 4/1988 | Ewbank et al. | 137/625.38 |
| 4,887,431 A | 12/1989 | Peet | 60/667 |
| 4,909,445 A | 3/1990 | Schoonover | |
| 4,941,502 A | 7/1990 | Loos et al. | 137/116 |
| 4,967,998 A | 11/1990 | Donahue | 251/121 |
| 5,005,605 A | 4/1991 | Kueffer et al. | 137/625.39 |
| 5,012,841 A | 5/1991 | Kueffer | 137/625.39 |
| 5,156,680 A | 10/1992 | Orzechowski | 118/46 |
| 5,336,451 A | 8/1994 | Lovick | |
| 5,380,470 A | 1/1995 | Jacobsson | |
| 5,385,121 A * | 1/1995 | Feiss | 122/459 |
| 5,390,896 A | 2/1995 | Smirl | 251/127 |
| 5,427,147 A | 6/1995 | Henriksson | 137/625.3 |
| 5,672,821 A | 9/1997 | Suzuki | 73/202 |
| 5,730,416 A | 3/1998 | Welker | 251/118 |
| 5,762,102 A | 6/1998 | Rimboym | 137/492.5 |
| 5,765,814 A | 6/1998 | Dvorak et al. | 251/127 |
| 5,769,388 A | 6/1998 | Welker | 251/118 |
| 5,819,803 A | 10/1998 | Lebo et al. | 138/42 |
| 5,924,673 A | 7/1999 | Welker | 251/118 |
| 5,931,445 A | 8/1999 | Dvorak et al. | 251/118 |
| 6,003,551 A | 12/1999 | Wears | 137/625.33 |
| 6,105,614 A | 8/2000 | Bohaychuk et al. | 137/625.3 |
| 6,250,330 B1 | 6/2001 | Welker | 137/489 |
| 6,289,934 B1 | 9/2001 | Welker | 138/39 |
| 2002/0096052 A1 | 7/2002 | Higuchi | |

\* cited by examiner

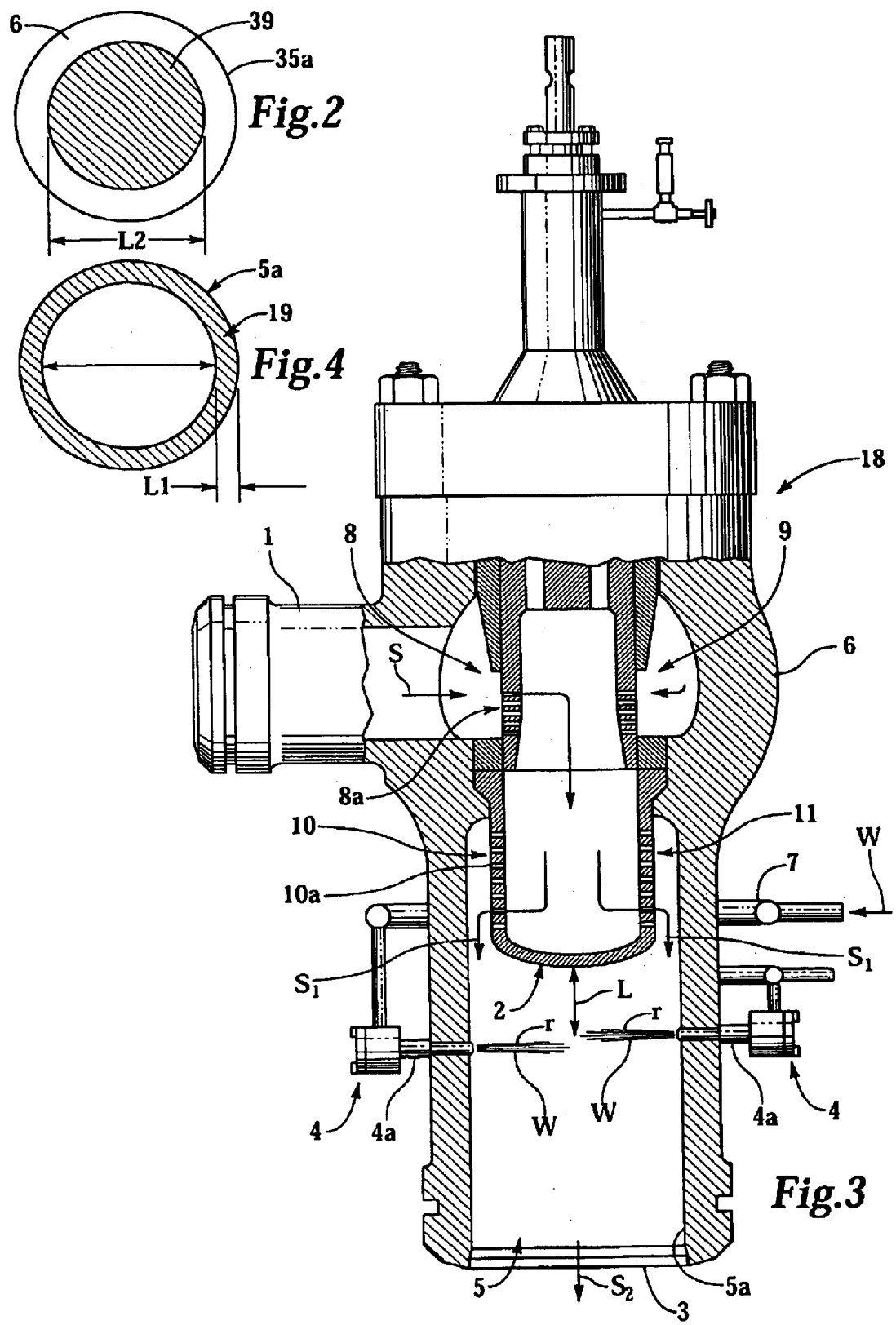

STEAM PRESSURE REDUCING AND CONDITIONING VALVE

TECHNICAL FIELD OF THE INVENTION

The present invention concerns a steam pressure and conditioning valve.

RELATED APPLICATION

The present invention includes common subject matter disclosed in U.S. application Ser. No. 10/039,345, entitled Steam Pressure Reducing and Conditioning Valve by the same inventor Hiroyuki Higuchi, filed concurrently on Jan. 4, 2002, the disclosure of which is incorporated herein by reference.

BACKGROUND OF THE INVENTION

Applicant has discovered a further refinement and improvement to the steam pressure reducing and conditioning valve (hereinafter "conditioning valve") for which he has made application for letters patent in application U.S. Ser. No. 10/039,345 by inventor Hiroyaki Higuchi filed concurrently with this application on Jan. 4, 2002 under.

A first embodiment of the invention as described and claimed in the aforementioned related application may be described as follows.

As illustrated in FIG. 3, a first embodiment of the present invention comprises a vapor change valve 18 for passing hot and high pressure steam S inflowing from a first port 1 through a pressure reducing section 2, and supplying subcooled water W and discharging desuperheated and depressurized steam S2 from a second port 3. One or more nozzles 4 for supplying subcooled water W are provided in proximity to said pressure reducing section 2. A flat nozzle 4a injects subcooled water W in a planar pattern r. Nozzle 4 is positioned so that there is a predetermined distance L between the jet pattern r of subcooled water W injected from flat nozzle 4a and the pressure reducing section 2. In the first embodiment, conditioning valve 18 includes a pressure reducing section 2 with a bottom and a cylindrical shape. The subcooled water W jet pattern r is selected to be substantially parallel to the bottom of the pressure reducing section 2. It will be understood by those skilled in the art that one or more of nozzles 4 for injecting moisture W may be juxtaposed in several stages in the a moisture supply section 5 of valve 18. The nozzle 4 disposed in the position nearest to the pressure reducing section 2 is a flat nozzle 4a. Other nozzles 4 disposed further away from the pressure reducing section 2 may have jet patterns of either planar or conical.

Applicant has tested the first embodiment of the conditioning valve as illustrated in FIG. 3 and determined the following limitations:

First, as shown in FIG. 4, the vapor discharge area 19 has an annular shape narrow in width L1. Consequently, during the collision of outflow vapor S1 with the sub cooled water mist W, a part of subcooled water mist W crosses the moisture supply section 5, and impinges against the opposite side wall face 5a and liquefies (condenses), reducing the effective amount of subcooled water mist W to be contacted by the steam S1 flow.

Second, as shown in FIG. 4, the vapor discharge area 19 is near the wall face 5a of the body 6. The collision with the subcooled water mist W tends to occur in the vicinity of the wall face 5a.

As the result, a part of chilled water mist W is directed back to the proximal side wall face 5a and liquefied (condensed), so the subcooled water mist W does not work as effectively as it might.

BRIEF DESCRIPTION OF THE DRAWINGS

The disclosed invention will be described with reference to the accompanying drawings, which show important sample embodiments of the invention and which are incorporated in the specification hereof by reference. A more complete understanding of the present invention may be had by reference to the following Detailed Description when taken in conjunction with the accompanying drawings, wherein:

FIG. 2 is a planar representation of the vapor discharge pattern of the preferred embodiment of the present invention;

FIG. 3 is a side view of a first embodiment of conditioning valve having a portion of the valve cut away to illustrate a partial cross section view; and FIG. 4 is a planar representation of the vapor discharge pattern of the conditioning valve of FIG. 3.

SUMMARY OF THE INVENTION

Figure 1:
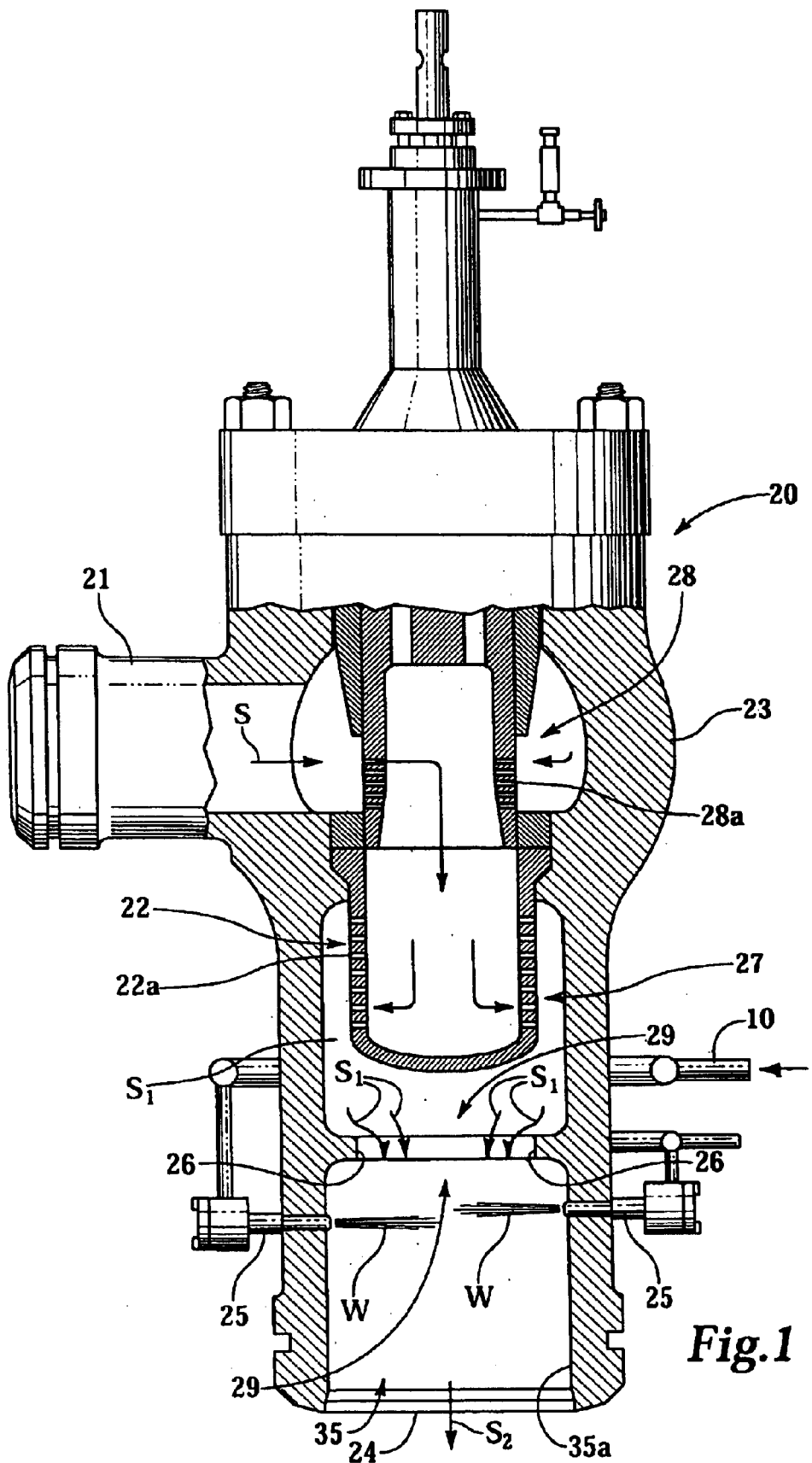
FIG. 1 is a side view of a preferred embodiment of conditioning valve of the present invention having a portion of the valve cut away to illustrate a partial cross-section view.

In the preferred embodiment, the present invention comprises a conditioning valve 20, having a first port 21 for inflowing a superheated steam S, a body 23 having a diffuser 22 where small holes 22a are scattered on the side, and a second port 24 for discharging desuperheated and depressurized steam S2, one or more nozzles 25 supplying subcooled water W to the depressurized steam S1 exiting from the small hole 22a of the diffuser 22 side face toward the second port 24, wherein a protrusion 26 projects inward in a vapor discharge path 29 of said body 23 between the diffuser 22 and a moisture supply section 35, and it is so structured that the depressurized steam S1 exiting from said small hole 22a is concentrated into the body 23 by this protrusion 26, made to pass inside said protrusion 26, and then cooled down by supplying the steam S1 with subcooled water W.

In operation, superheated steam S inflowing from a first port 21 passes through the small hole 22a of the diffuser 22, is concentrated into the body 23 by the protrusion 26 provided between the diffuser 22 and the moisture supply section 35, made to pass inside said protrusion 26, supplied with moisture W from the moisture supply section 35, and then discharged as depressurized and desuperheated steam S2 from the second port 24.

Additionally, when the moisture W is further subdivided by the collision of a high speed vapor S1 flow with the subcooled water W, and this dispersed subcooled water W is contacted by the vapor S1 flow, steam S1 can be cooled down effectively (if the steam S1 flows slowly, the moisture will not be subdivided (dispersed) and will not cool steam S1.

In the preferred embodiment of the present invention, as distinguished from the first embodiment disclosed in FIGS. 3 and 4, the vapor flow area 39 has a circular shape of large width L2 as shown in FIG. 2. The protrusion 26 provided in the vapor discharge path 29 of the body 23 decreases the cross-sectional flow area and increases the velocity of steam S1. As the result, the collision of a part of moisture W with the opposite side wall face 35a mentioned as the first limitation of the first embodiment is reduced, and moreover, the contacting of the subcooled water W and the steam S1 takes place in the middle, and not in the vicinity of the wall face 35a as in the second limitation of the first embodiment. As a result, a smaller portion of the subcooled water W is returned to the proximal side wall face 35a and impinged against it, achieving, thereby, an effective cooling.

DETAILED DESCRIPTION OF THE PREFERRED EMBODIMENT

Reference is now made to the Drawings wherein like reference characters denote like or similar parts throughout the Figures.

This preferred embodiment comprises a cylindrical body 23 provided with a first port 21 for introducing a superheated steam S and a second port 24 for discharging desuperheated and depressurized steam S2. The body 23 is provided with a pressure reducing section 27 for depressurizing the superheated steam S, and a moisture supply section 35 for desuperheating by injecting droplets of subcooled water W into the vapor S1 having passed through this pressure reducing section 27. It will be understood by those skilled in the art that vaporization of the subcooled water droplets will lower the temperature (desuperheat) the steam S1.

The pressure reducing section 27 comprises, as shown in FIG. 1, a vertically movable plug 28 having a small hole section provided with small holes 28a scattered around a cylindrical body with an open lower end, and a diffuser 22 fixed to the body 23 at the lower position of this plug 28, and provided with small holes 22a scattered around a cylindrical body with a bottom and an open upper end, and is structured to depressurize superheated steam S by passing through this plug 28 and the diffuser 22 and transform it into an annular flow vapor S1 along the inner wall 35a of the body 23.

The moisture supply section 35 includes nozzles 25 for supplying atomized subcooled water ("moisture") W in the longitudinal direction of the body 23 and in several stages longitudinally in the vapor S1 flow direction.

Moreover, this embodiment disposes a protrusion 26 in the vapor discharge path 39 of the body 23 between the diffuser 22 and the moisture supply section 35.

This protrusion 26 is formed, as shown in FIG. 1, by projecting the inner wall 35a of the body 23 a predetermined amount. In the preferred embodiment, the protrusion has an annular section in its plan view. However, discontinuous projections may be used or projection having non-annular plan views may be used.

Consequently, the steam S1 exiting from the diffuser 22 is concentrated inward from the body by this protrusion 26 increasing the velocity of steam S1, and passes through the moisture supply section 35 in a cylindrical state.

In operation, the superheated steam S inflowing from a first port 21 passes through the small hole 22a of the diffuser 22, exits opening 22a in diffuser 22 along the inner wall 35a of the body 23, once concentrated into the body 23 by the protrusion 26 provided between the diffuser 22 and the moisture supply section 35, made to pass inside said protrusion 26, supplied with moisture W from the moisture supply section 35, and then discharged as desuperheated and depressurized steam from the second port 24.

Therefore, this preferred embodiment can prevent the moisture W from condensing as much as possible, and deploy an extremely effective cooling function.

The structure of the preferred embodiment can transfer the flow direction energy of the vapor S1 more effectively to the moisture W, so that the subcooled water W supplied from the moisture supply section 35 will be dispersed more effectively by the vapor S flow.

In theory, droplets of subcooled water W will condense less and result in better cooling effect if the moisture W is supplied to an enlarged contact area for steam S1 by increasing the velocity S1; however, the aforementioned first embodiment cannot meet both conditions at the same time (if the gap between the body 23 and the diffuser 22 is restricted to increase the S1 velocity, naturally, the vapor S1 contact area becomes narrower. If the flow rate is increased too much, large noise or other problems may happen).

In this respect, adopting the aforementioned structure of the preferred embodiment can deploy a better cooling function than the first embodiment.

To be more specific, for instance, in the first embodiment of FIGS. 3 and 4, the vapor S1 flow area has an annular configuration 19 as shown in FIG. 4. wherein the area where the vapor S1 is supplied with moisture W from the moisture supply section 5. Therefore, the width (distance) where the vapor S1 contacts the moisture W is L1, while, in the preferred embodiment of FIGS. 1 and 2, by adopting a structure wherein a protrusion 26 is disposed on the wall face 35a of the body 23, for instance, in the case where this protrusion 26 is annular, the vapor S flow has a circular configuration 39 as shown in FIG. 2; therefore, the width (distance) where the steam S1 contacts moisture W to be supplied to this annular steam S1 is L2 which is larger (in the aforementioned comparison, it is supposed that the subcooled water W is supplied to a cylinder where the cross-section area of embodiments is identical.

A larger steam S1 width L2 means that the area where the even flow rate distribution is sustained immediately after the exiting of vapor S1 (potential core area) extends further downstream, and therefore, this embodiment provides an enlarged steam width, and maintains the steam S1 high velocity further downstream (to the moisture supply section 35).

Moreover, in the preferred embodiment, the presence of the protrusion 26 provided in the vapor discharge path 29 of the body 23 prevents the collision of steam S1 and moisture W in the immediate vicinity of the wall 35a, by concentrating the steam S1 from the diffuser 23 inward from the body 23.

As mentioned before, this embodiment provides a large steam S1 flow by concentrating the vapor S1 inward, by disposing a protrusion 26 on the wall face 23a of the body, and moreover, to sustain a higher velocity (flow rate immediately after the expulsion 22) further downstream (because the flow direction energy of the vapor S1 can be transferred more effectively to the moisture W), creating an environment where the moisture W supplied from the moisture supply section 35 arrives hardly as much at the opposed wall face 35a of the body 23, and where the moisture W returns hardly to the supply side wall face 35a, preventing the liquefaction (condensation) and deploying an extremely effective cooling function.

Figure 5:
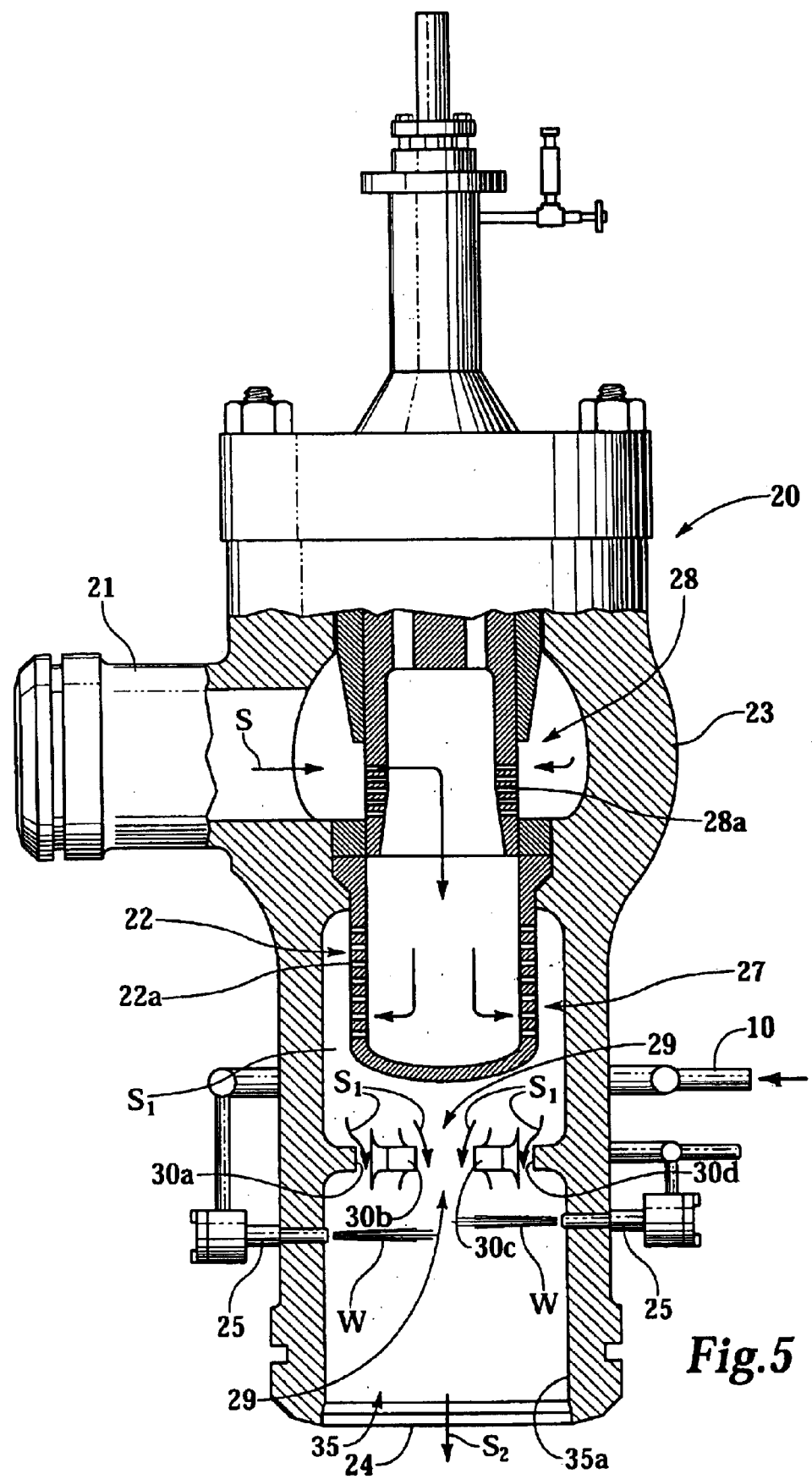
FIG. 5 is a side view of a preferred embodiment of conditioning valve of the present invention having a portion of the valve cut away to illustrate a partial cross-section view.

FIG. 5 illustrates another preferred embodiment of a conditioning valve of the present invention. The embodiment of the conditioning valve illustrated by FIG. 5 is similar to the embodiment in FIG. 1, except that the FIG. 5 embodiment has a plurality of protrusions 30 for directing flow inward. Protrusions 30 may be formed by projecting inner wall 35a of body 23a predetermined amount.

A preferred embodiment of the invention has been illustrated in the accompanying Drawings and described in the foregoing Detailed Description. It will be understood that the invention is not limited to the embodiment disclosed, but is capable of numerous modifications without departing from the scope of the invention as claimed.

I claim:

1. A stream pressure reducing and conditioning valve comprising:
   a pressure reducing section for reducing steam pressure and transforming the steam into annular flow;
   one or more protrusions downstream of the pressure reducing section for concentrating the annular flow inward;
   a moisture supply section downstream of the pressure reducing section comprising one or more nozzles for injecting water into the concentrated annular flow, wherein at least one nozzle is downstream of at least one of the one or more protrusions.

2. A steam pressure reducing and conditioning valve comprising:
   a pressure reducing section comprising a plug and a diffuser for reducing steam pressure and transforming steam into annular flow;
   a moisture supply section downstream of the pressure reducing section and having an inner wall face and one or more nozzles for injecting water into the steam; and
   a protrusion downstream of the pressure reducing section for concentrating the annular flow inward away from the inner wall face of the moisture supply section.

3. The valve of claim 2, wherein the protrusion is annular.

4. The valve of claim 3, wherein each of the one or more nozzles are downstream of the protrusion.

5. The valve of claim 2, wherein the plug is movable.

6. The valve of claim 2, wherein the diffuser comprises a bottom and a side and the side comprises a plurality of holes.

7. A stream pressure reducing and conditioning valve comprising:
   a body having an inner wall;
   a pressure reducing section in the body for reducing steam pressure and transforming the steam into annular flow;
   a plurality of protrusions extending inward from the inner wall downstream of the pressure reducing section for concentrating the annular flow; and
   a moisture supply section downstream of the pressure reducing section for injecting water into the concentrated annular flow.

8. A steam pressure reducing and conditioning comprising:
   a pressure reducing section for reducing steam pressure and transforming steam into annular flow;
   a moisture supply section downstream of the pressure reducing section for injecting water into the steam, wherein the moisture supply section comprises an inner wall defining a first area perpendicular to the annular flow; and
   a protrusion between the pressure reducing section and the moisture supply section, wherein the protrusion defines a second area perpendicular to the annular flow and the second area is smaller than the first area in the moisture supply section.

9. A method of treating superheated steam, the method comprising:
   receiving a flow of superheated steam in a first port;
   transforming the flow into an annular flow;
   directing the annular flow parallel to and spaced apart from an inner wall defining a moisture supply section;
   injecting water into the annular flow of steam as it passes through the moisture supply section; and
   discharging the steam out a second port.

10. The method of claim 9, wherein directing the annular flow parallel to and spaced apart from the inner wall comprises concentrating the annular flow inward.

11. The method of claim 10, wherein concentrating the annular flow inward comprises directing the flow through a first area perpendicular to the flow that is smaller than a moisture supply section area perpendicular to the flow.

12. The method of claim 9, comprising increasing annular flow speed prior to injecting water into the flow.

\* \* \* \* \*

UNITED STATES PATENT AND TRADEMARK OFFICE
CERTIFICATE OF CORRECTION

PATENT NO. : 6,715,505 B2
DATED : April 6, 2004
INVENTOR(S) : Hiroyuki Higuchi

It is certified that error appears in the above-identified patent and that said Letters Patent is hereby corrected as shown below:

Title page,
Item [75], Inventor, insert -- shi -- after "Kashiwazaki"
Item [56], References Cited, U.S. PATENT DOCUMENTS, delete "3,856,149" and replace with -- 3,856,049 --.
Item [57], ABSTRACT,
Line 6, delete "nozzles 35" and replace with -- nozzles 25 --.
Line 9, delete "moisture supply section 25" and replace with -- nozzles 35 --.

Column 4,
Line 46, delete "diffuser 23" and replace with -- diffuser 22 --.
Line 50, delete "wall face 23*a*" and replace with -- wall face 35*a* --.
Line 52, delete "22".
Line 67, delete "23*a*" and insert -- 23 a --.

Signed and Sealed this

Sixth Day of September, 2005

JON W. DUDAS
*Director of the United States Patent and Trademark Office*